Figure 1:
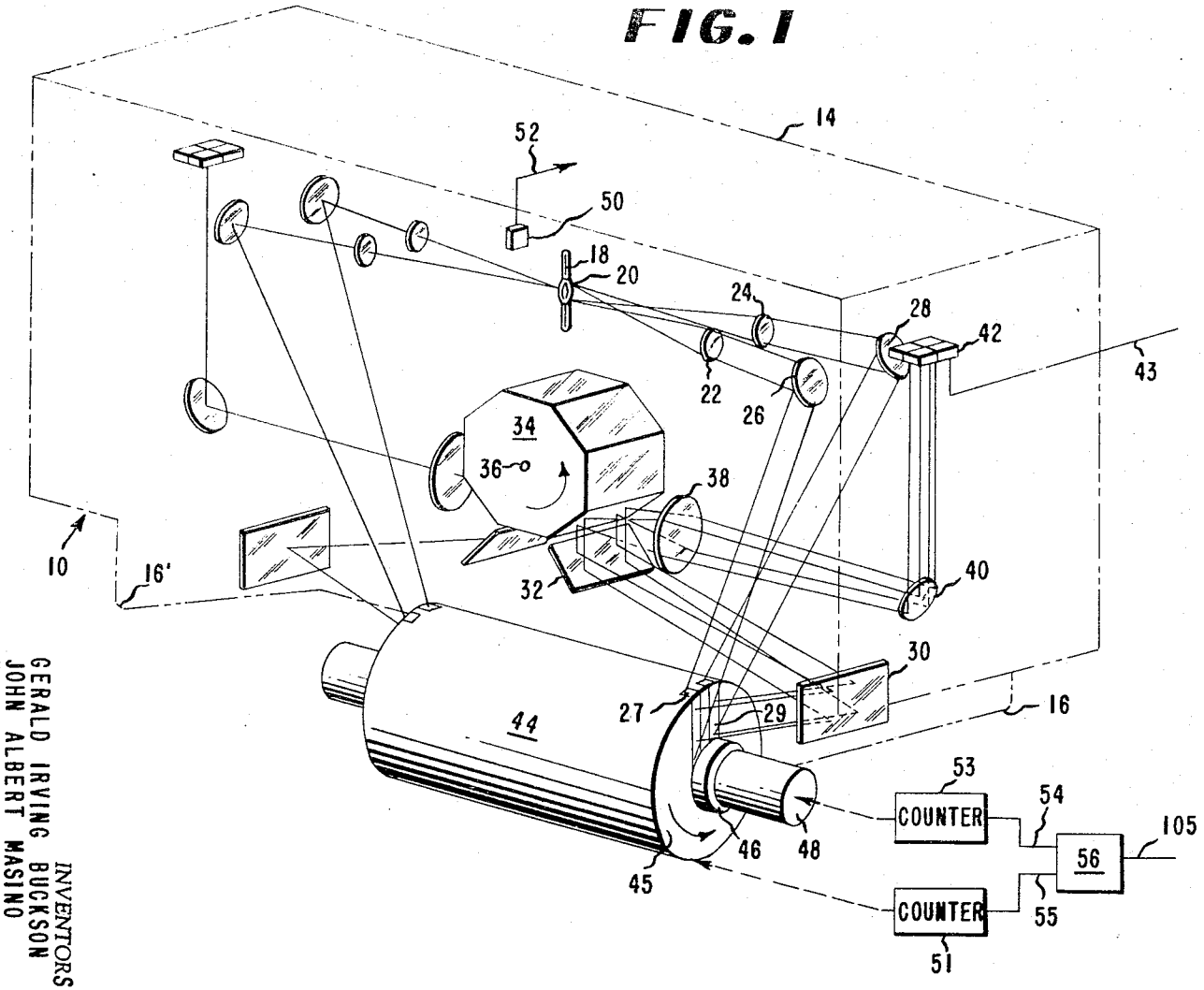
Figure 2:
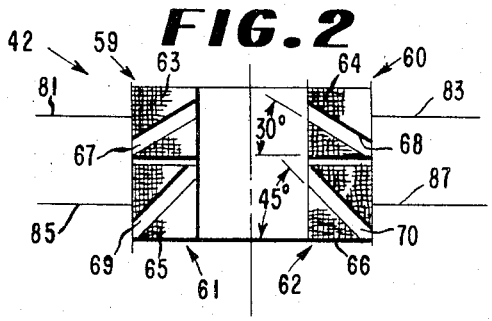
Figure 4:
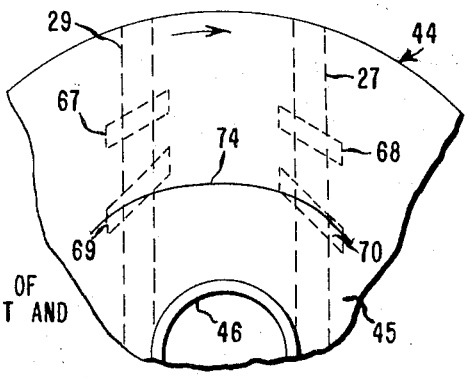
Figure 3:
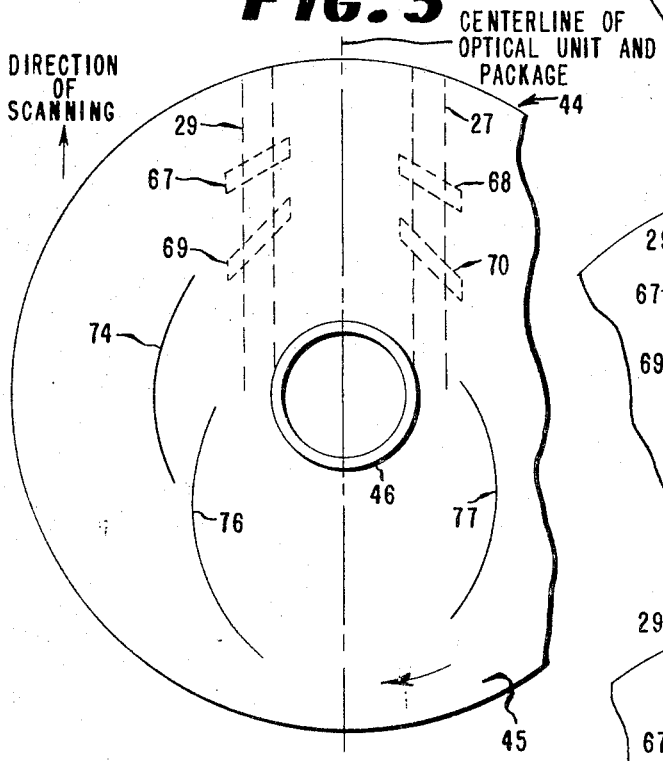
Figure 5:
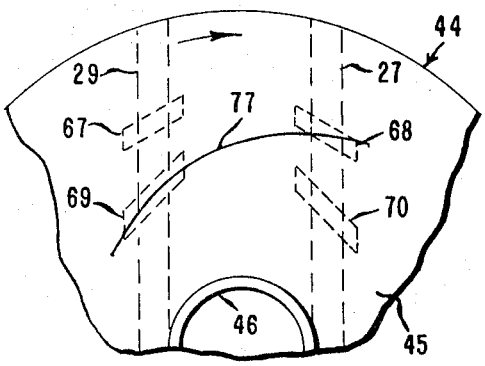
Figure 6:
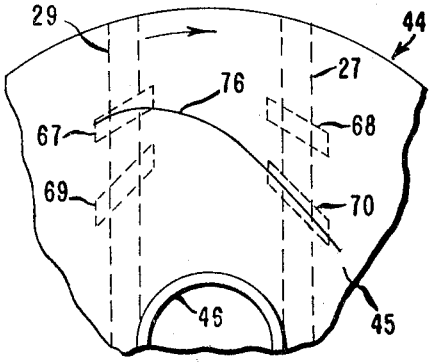
Figure 7:
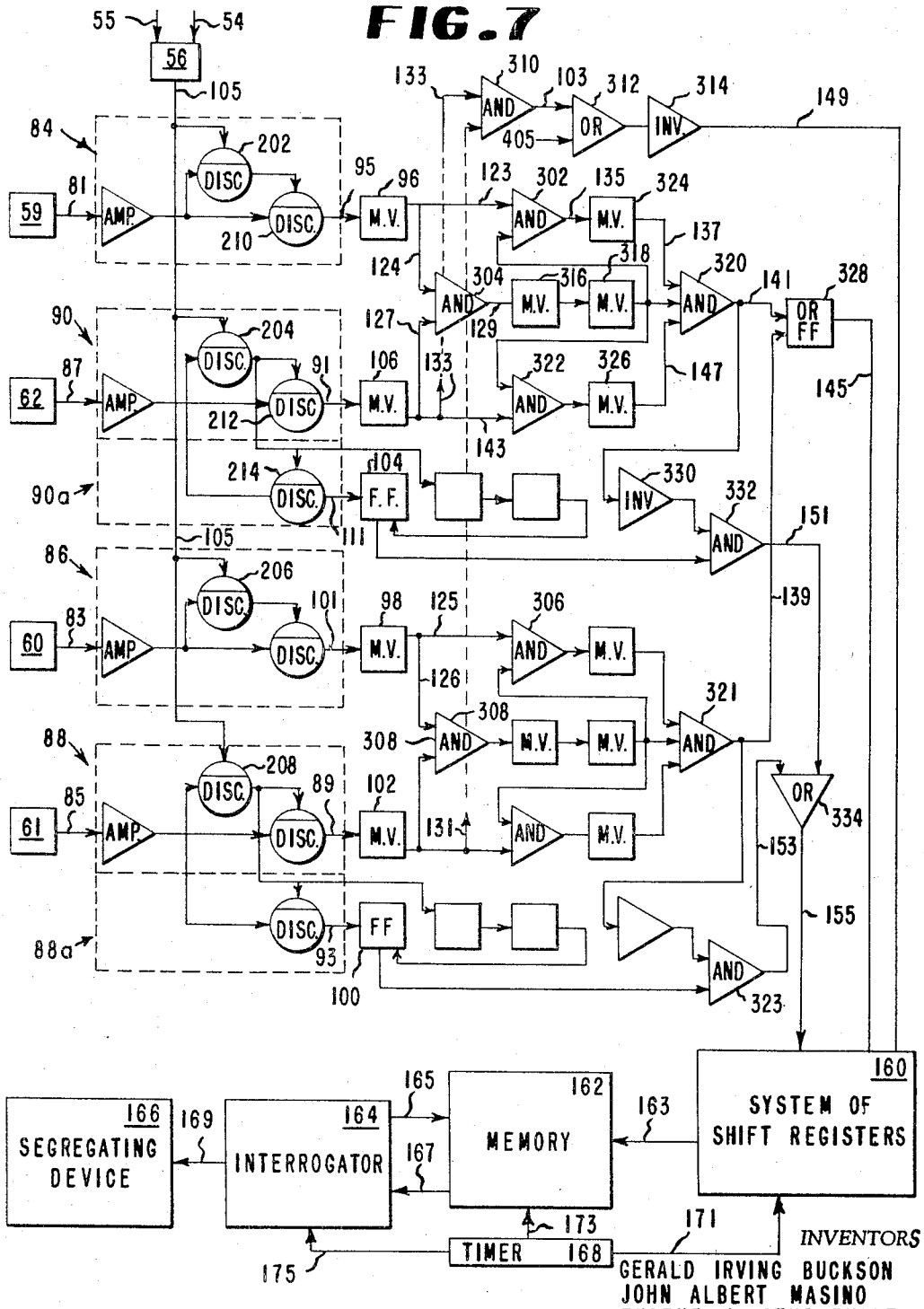

T861056

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 29, 1969

861 O.G. 1356

751,270

RADIATION SENSITIVE APPARATUS FOR DETECTING ROTATING YARN PACKAGE DEFECTS

Gerald Irving Buckson, Newark, and John Albert Masino, Eugene J. Sturdevant, and Stanley Victor Williams, Wilmington, Del., assignors to E. I. du Pont de Nemours and Company, Wilmington, Del., a corporation of Delaware

Filed Aug. 8, 1968. Published Apr. 29, 1969
Int. Cl. G01n *21/30;* H01j *39/12, 3/14*
U.S. Cl. 250—219
3 Sheets Drawing. 16 Pages Specification

An apparatus for detecting package formation defects on the end surface of a rotating cylindrical yarn package wherein at least two parallel strips of light are projected onto the end surface. The illuminated portions of the end surface are viewed and the illumination therefrom is directed to photosensitive means which detects variations in the intensity of the illumination and emits electrical signals equivalent thereto. Electronic components are provided to amplify and discriminate signals

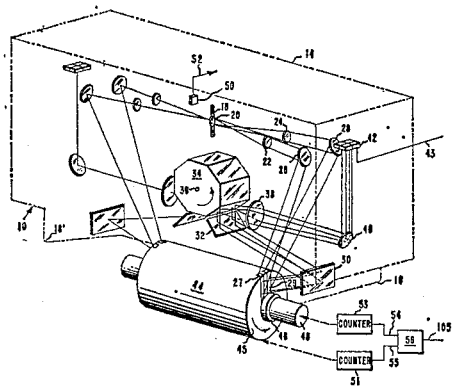

received from the photodetectors in order to detect and record defects exceeding predetermined levels. Means are also provided to segregate inspected packages having unacceptable package end formations. A duplicate apparatus arrangement is provided for simultaneously inspecting both end surfaces of the package.

T861056

April 29, 1969 G. I. BUCKSON ET AL DEF. PUB.

RADIATION SENSITIVE APPARATUS FOR DETECTING ROTATING YARN PACKAGE DEFECTS

SN-751270

Filed Aug. 8, 1968 Sheet 1 of 3

INVENTORS
GERALD IRVING BUCKSON
JOHN ALBERT MASINO
EUGENE J. STURDEVANT
STANLEY VICTOR WILLIAMS

BY Howard P. West Jr.
ATTORNEY

T861056

April 29, 1969 G. I. BUCKSON ET AL DEF. PUB.

RADIATION SENSITIVE APPARATUS FOR DETECTING ROTATING YARN PACKAGE DEFECTS

SN-751270

Filed Aug. 8, 1968 Sheet 2 of 3

INVENTORS
GERALD IRVING BUCKSON
JOHN ALBERT MASINO
EUGENE J. STURDEVANT
STANLEY VICTOR WILLIAMS
BY Howard P. West Jr.
ATTORNEY

T861056

April 29, 1969 G. I. BUCKSON ET AL DEF. PUB.

RADIATION SENSITIVE APPARATUS FOR DETECTING ROTATING YARN PACKAGE DEFECTS

SN-751270

Filed Aug. 8, 1968 Sheet 3 of 3

INVENTORS
GERALD IRVING BUCKSON
JOHN ALBERT MASINO
EUGENE J. STURDEVANT
STANLEY VICTOR WILLIAMS

BY Howard P. West Jr.
ATTORNEY